(12) United States Patent
Xie et al.

(10) Patent No.: US 9,137,152 B2
(45) Date of Patent: Sep. 15, 2015

(54) METHOD FOR SCALABLE ROUTING IN CONTENT-ORIENTED NETWORKS

(71) Applicant: Futurewei Technologies, Inc., Plano, TX (US)

(72) Inventors: Haiyong Xie, Union City, CA (US); Guoqiang Wang, Santa Clara, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 265 days.

(21) Appl. No.: 13/768,944

(22) Filed: Feb. 15, 2013

(65) Prior Publication Data

US 2014/0233575 A1    Aug. 21, 2014

Related U.S. Application Data

(60) Provisional application No. 61/599,702, filed on Feb. 16, 2012.

(51) Int. Cl.
*H04L 12/721* (2013.01)
*H04L 12/741* (2013.01)
*H04L 12/725* (2013.01)

(52) U.S. Cl.
CPC .............. *H04L 45/44* (2013.01); *H04L 45/306* (2013.01); *H04L 45/54* (2013.01)

(58) Field of Classification Search
None
See application file for complete search history.

(56) References Cited

U.S. PATENT DOCUMENTS

| | | | |
|---|---|---|---|
| 6,094,687 A * | 7/2000 | Drake et al. | 709/241 |
| 8,762,477 B2 * | 6/2014 | Xie et al. | 709/213 |
| 2003/0099237 A1 * | 5/2003 | Mitra et al. | 370/393 |
| 2009/0287835 A1 * | 11/2009 | Jacobson | 709/229 |
| 2010/0195655 A1 * | 8/2010 | Jacobson et al. | 370/392 |
| 2011/0161355 A1 * | 6/2011 | Lee et al. | 707/769 |
| 2011/0280214 A1 * | 11/2011 | Lee et al. | 370/331 |
| 2013/0041972 A1 * | 2/2013 | Field et al. | 709/213 |

OTHER PUBLICATIONS

"Internet2 IP Network—IGP Metrics (based on fiber route kilometers)," http://noc.net.internet2.edu/i2network/maps-documentation/maps/internet2-ip-igp-metrics2.html, Apr. 22, 2009, 1 page.

Somaya Arianfar, et al., "On Preserving Privacy in Content-Oriented Networks," Proceedings of the ACM SIGCOMM Workshop on Information-Centric Networking (ICN '11), Toronto, Canada, Aug. 19, 2011, pp. 19-24.

(Continued)

*Primary Examiner* — Timothy J Weidner (74) *Attorney, Agent, or Firm* — Conley Rose, P.C.; Grant Rodolph; Brandt D. Howell (57) ABSTRACT

A method for routing content, comprising receiving an interest packet from a first face, wherein the interest packet comprises a content name field populated with a first content name, a destination field, and a broadcast flag field set to broadcast, wherein the broadcast field indicates whether the first face has previously received a request having the first content name, and receiving a data packet from a second face, wherein the data packet comprises a content name field populated with a second content name, a source field populated with the identity of a source of data associated with the second content name, and a data field populated with the data associated with the second content name.

19 Claims, 7 Drawing Sheets

(56) References Cited

OTHER PUBLICATIONS

Somaya Arianfar, et al., "On Content-Centric Router Design and Implications," Proceedings of the Re-Architecting the Internet Workshop (ReARCH '10), ACM, Philadelphia, Pennsylvania, Nov. 30, 2010, Article 5, 6 pages.

Hari Balakrishnan, et al., "A Layered Naming Architecture for the Internet," Proceedings of the 2004 Conference on Applications, Technologies, Architectures, and Protocols for Computer Communications (SIGCOMM '04), ACM, Portland, Oregon, Aug.-Sep. 2004, 10 pages.

Yosra Barouni, et al., "Content-Centric Routing for the Autonomic Networks," Proceedings of the 2nd International Conference on Autonomic Computing and Communication Systems (Autonomics '08), ICST (Institute for Computer Sciences, Social-Informatics and Telecommunications Engineering), ICST, Brussels, Belgium, 2008, Article 12, 6 pages.

Yosra Barouni, et al., "Magnet: A Content Centric Routing Protocol for Large Scale Networks," Proceedings of the 4th International Conference on Future Internet Technologies (CFI '09), ACM, Seoul, Korea, Jun. 2009, pp. 28-31.

Giovanna Carofiglio, et al., "Modeling Data Transfer in Content-Centric Networking," Proceedings of the 23rd International Teletraffic Congress (ITC '11), ITCP, Sep. 2011, 8 pages.

Matteo D'Ambrosio, et al., "MDHT: A Hierarchical Name Resolution Service for Information-Centric Networks," Proceedings of the ACM SIGCOMM Workshop on Information-Centric Networking (ICN '11), Toronto, Canada, Aug. 2011, pp. 7-12.

Christian Dannewitz, "NetInf: An Information-Centric Design for the Future Internet," Proceedings of the 3rd GI/ITG KuVS Workshop on the Future Internet, May 2009, 3 pages.

Mohamed Diallo, et al., "Towards Extreme Scale Content-Based Networking for the Next Generation Internet," IEICE Trans. Commun., vol. 94-B, No. 10, Oct. 2011, pp. 2706-2714.

Steven DiBenedetto, et al., "Routing Policies in Named Data Networking," Proceedings of the ACM SIGCOMM Workshop on Information-Centric Networking (ICN '11), Toronto, Canada, Aug. 19, 2011, pp. 38-43.

Ali Ghodsi, et al., "Naming in Content-Oriented Architectures," Proceedings of the ACM SIGCOMM Workshop on Information-Centric Networking (ICN '11), Toronto, Canada, Aug. 19, 2011, pp. 1-6.

Jesse Alpert, et al., "We Knew the Web Was Big," http://googleblog.blogspot.com/2008/07/we-knew-web-was-big.html, Juy 25, 2008, 2 pages.

Mark Griller, et al., "An Architecture for Content Routing Support in the Internet," Proceedings of the 3rd Conference on USENIX Symposium on Internet Technologies and Systems—vol. 3 (USITS'01), USENIX Association, Berkeley, California, USA, Mar. 2001, 12 pages.

Van Jacobson, et al., "VoCCN: Voice-Over Content-Centric Networks," Proceedings of the 2009 Workshop on Re-architecting the Internet (ReArch '09), ACM, Rome, Italy, Dec. 2009, 6 pages.

Van Jacobson, et al., "Networking Named Content," Proceedings of the 5th International Conference on Emerging Networking Experiments and Technologies (CoNEXT '09), ACM, New York, New York, USA, Dec. 2009, 12 pages.

Teemu Koponen, et al., "A Data-Oriented (and Beyond) Network Architecture," Proceedings of the 2007 Conference on Applications, Technologies, Architectures, and Protocols for Computer Communications (SIGCOMM '07), ACM, Kyota, Japan, Aug. 2007, 12 pages.

Michael Meisel, et al., "Ad Hoc Networking via Named Data," Proceedings of the Fifth ACM Workshop on Mobility in the Evolving Internet Architecture (MobiArch), Chicago, Illinois, USA, Sep. 2010, 6 pages.

Netcraft, "Dec. 2011 Web Server Survey," http://news.netcraft.com/archives/2011/12/09/december-2011-web server-survey.html, Dec. 9, 201, 4 pages.

Sara Oueslati, et al., "Flow-Aware Traffic Control for a Content-Centric Network," INFOCOM, 2012 Proceedings IEEE , Mar. 2012, pp. 2417-2425.

Ioannis Psaras, et al., "Modelling and Evaluation of CCN-caching Trees," Proceedings of the 10th IFIP Networking, Valencia, Spain, May 2011, 14 pages.

Lixia Zhang, et al., "Named Data Networking (NDN) Project," Technical Report NDN-0001, Oct. 2010, 26 pages.

Zhenkai Zhu, et al., "ACT: Audio Conference Tool Over Named Data Networking," Proceedings of the ACM SIGCOMM Workshop on Information-Centric Networking (ICN '11), Toronto, Canada, Aug. 2011, pp. 68-73.

Foreign Communication From a Counterpart Application, PCT Application PCT/US2013/026456, International Search Report dated May 15, 2013, 4 pages.

Foreign Communication From a Counterpart Application, PCT Application PCT/US2013/026456, Written Opinion dated May 15, 2013, 7 pages.

Zhang, L., "Named Data Networking (NDN) Project," XP-002687393, Technical Report NDN-0001, Internet Citation, Oct. 31, 2010, 26 pages.

Jacobson, V., "Networking Named Content," XP-002608160, CoNext '09 Proceedings of the 5th International Conference on Emerging Networking Experiments and Technologies, Dec. 1-4, 2009, 13 pages.

* cited by examiner

METHOD FOR SCALABLE ROUTING IN CONTENT-ORIENTED NETWORKS

CROSS-REFERENCE TO RELATED APPLICATIONS

This application claims priority to U.S. Provisional Application No. 61/599,702, filed Feb. 16, 2012 by Haiyong Xie, et al., titled "A Method for Scalable Routing In Content-Oriented Networks," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Name-based routing is a present paradigm for network routing. Name-based routing has served the traditional "host-to-host" communication model for many years. Name-oriented networking efforts include Content-Centric Network (CCN) and Named data Networking (NDN). However, a paradigm shift from a "host-to-host" model to a "host-to-content" or "host-to-information" model appears imminent. The CCN and NDN have attempted to adopt name-based routing to enable the "host-to-content" communication model, specifically, by utilizing content objects with structured names. In name-based routing, e.g., CCN and NDN, a content origin or source that owns original content objects may announce name prefixes into the network. Such announcements may be propagated throughout the network via intra-domain routing protocols, such as Open Shortest Path First (OSPF). A Forward Information Base (FIB) in each router may store to which interface ("face") the router may forward any request for a named content matching a given name prefix. Upon receiving name prefix announcements, each router may update the corresponding FIB accordingly. Clients may send interest packets requesting for interested content, and the network may respond with data packets of the requested content. The CCN and NDN may also use other components, such as a Content Store (CS) and a Pending interest Table (PIT). The CS may be used to store cacheable content objects for efficient content distribution, and the PIT may be used to aggregate pending interests for the same content and propagate data packets, e.g., in a multicast manner, towards the requesting clients.

However, name-based routing in CCNs (and NDNs) may also pose challenges to network scalability. In current CCN design, content origins (or their first-hop routers) may have to be propagated throughout the network via either intra-domain protocols, such as OSPF, or similar protocols, e.g., similar to how Internet Protocol (IP) prefixes are announced in an intra-domain network. This scheme is referred to herein as the proactive routing scheme. However, the number of distinct name prefixes of future systems is expected to be large, even after aggressive aggregation. Propagating large numbers of name prefixes may be challenging since this may overload routers and consume a substantial portion of network bandwidth. Additionally, the number of name prefixes may be multiple orders of magnitude larger than what the conventional FIB may store, thus the FIB may only store a subset or a portion of name prefixes. As a result, the FIB may miss when the FIB has no knowledge about where to forward interests. Such misses may be common and name-based routing may heavily rely on fallback schemes, e.g., broadcast interests, to address FIB misses, degrading network performance and user experiences. Further, the fallback scheme adopted in CCN may become another cause for overloading routers, consuming a significant portion of network bandwidth, and degrading network performance.

Reusing intra-domain routing protocols (e.g., OSPF with CCN adaptation) has been proposed to propagate name prefixes to all routers in an intra-domain network. However, the number of name prefixes is likely to increase at least at the scale of domain names in the Internet. Re-using OSPF-like protocols may lead to further network scalability challenges. For instance, in the case of domain names with an average length of about 16 bytes, announcements of about 0.5 billion domain names may generate $8 \times 10^9$ bytes of traffic. If those names are announced in about 1-minute intervals, then for each network link, the average bandwidth consumed by periodical active announcements may be about 1 Giga bits per second (Gbps). Moreover, the number of name prefixes may be larger than the number of domain names, e.g., 10 times larger, yielding a bandwidth consumption due to name prefix announcement as high as about 10 Gbps.

SUMMARY

In one aspect, the disclosure includes a method for routing content, comprising receiving an interest packet from a first face, wherein the interest packet comprises a content name field populated with a first content name, a destination field, and a broadcast flag field set to broadcast, wherein the broadcast field indicates whether the first face has previously received a request having the first content name, and receiving a data packet from a second face, wherein the data packet comprises a content name field populated with a second content name, a source field populated with the identity of a source of data associated with the second content name, and a data field populated with the data associated with the second content name.

In another aspect, the disclosure includes an apparatus comprising a processor configured to receive an interest packet from a first forwarding interface (face), wherein the interest packet comprises a content name field populated with a content name, add the content name and the identity of the first face to a PIT, obtain a destination associated with the content name from a FIB, retrieve the identity of a second face associated with a transmission path to the destination from a Reachability Information Base (RIB), and forward the interest packet to the second face.

In yet another aspect, the disclosure includes a computer program product comprising computer executable instructions stored on a non-transitory medium that when executed by a processor cause the processor to perform the following receive an interest packet from a requesting face, wherein the interest packet comprises a content name field populated with a content name, check a CS for an entry associated with the content name, when the CS entry exists, send data from the entry to the requesting face, when the CS entry does not exist, check a PIT for an existing entry associated with the interest packet, when the PIT entry exists, drop the interest packet, when the PIT entry does not exist, create a PIT entry with the content name and the identity of the first face, check a FIB for a FIB entry associated with the content name, wherein the FIB entry comprises a destination, when the FIB entry exists, retrieve the destination from the FIB, retrieve the identity of a second face associated with a transmission path to the destination from a RIB, and forward the interest packet to the second face; and, when the FIB entry does not exist, forward the interest packet to a plurality of neighboring faces.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems, methods, and apparatuses for enabling reactive name-based routing to address the network scalability challenges in name-based networks, e.g., in CCN and NDN. The disclosure includes adding a RIB to the system architecture and changing the semantics of the FIB. The disclosure further includes changing Interest Packet and Data Packet packet headers to support the RIB/FIB changes.

Conventional content routers may comprise an index, a CS, a PIT, and a FIB, wherein the FIB stores the name prefix and forwarding information for desired content. Unlike conventional content routers, embodiments of the disclosed content router, e.g., the content router 200 of FIG. 2, may comprise a RIB for leveraging the benefits of host-oriented routing. Specifically, the RIB may store the forwarding face(s) that the content router may use to reach any router in the network. In typical intra-domain networks, the number of routers ranges may be less than a couple of thousand. Since the routers announce their names using intra-domain routing protocols described herein, each content router may be able to build a local RIB individually. Multi-path routing may be feasible if multiple forwarding faces are allowed in any RIB entry; however, routing loop prevention schemes may alternatively be adopted. If only a single forwarding face is allowed in any RIB entry, then the routing may be single-path routing and the benefits of potentially multi-path routing in CCN may be lost. However, there may be a gain of simplified routing and improved scalability. Additionally, disclosed embodiments may include a modified FIB, wherein each FIB entry may store a name prefix and the names of "landmark" routers for this prefix. Data packets configured with the disclosed header information may bear the origin's name (or an intermediate router's name). Consequently, upon receipt of such a data packet, a content router may update its FIB accordingly. The CS and PIT may be configured as in typical CCNs/NDNs.

The disclosure includes utilizing these and other changes to yield a reactive routing scheme, e.g., a scheme wherein the system uses reactive announcements to announce name prefixes only when interests for the prefixes are injected into the network. Active announcements may consume a significant portion of network bandwidth and may overload routers and, consequently, announcing name prefixes for less frequent, rarely, or never accessed contents may waste network bandwidth. A reactive routing scheme may take content popularity into account and may provide announcements when there is an interest. Accounting for popularity may further permit the scheme to behave like a cache for routing entries, e.g., by dynamically evicting cold entries to make space for popular ones.

Figure 1:
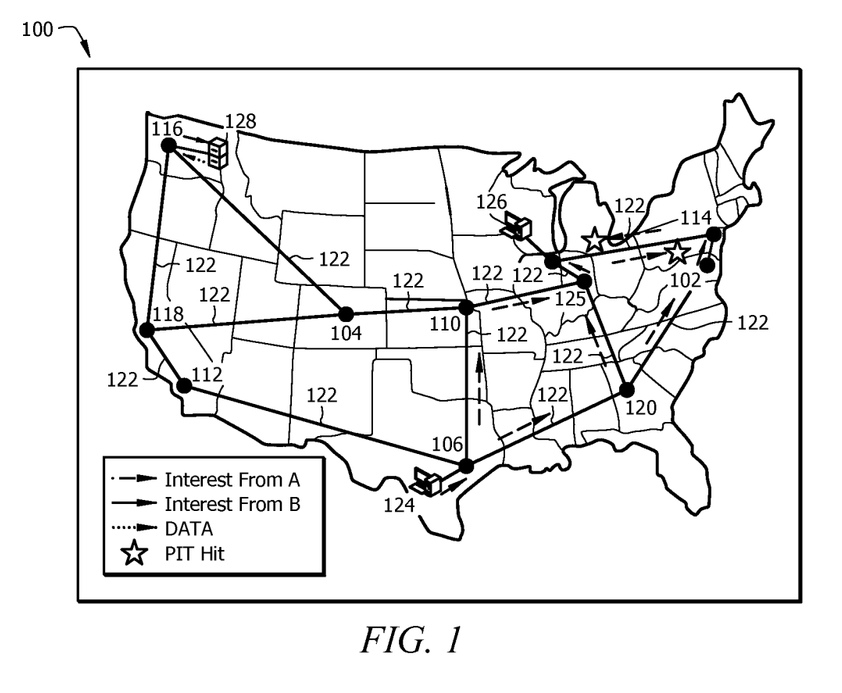
FIG. 1 depicts an interest starvation problem scenario in a CCN/NDN.

FIG. 1 illustrates an interest starvation problem scenario in a CCN/NDN 100. In the CCN/NDN 100, ten network nodes 102-120, e.g., routers, servers, switches, etc., are shown connected to each other by connections 122 in the manner depicted. FIG. 1 further shows a first client 124 connected to the CCN/NDN at node 106, a second client 126 connected at 102, and a content origin 128 connected at node 116. As depicted, the first client 124 may send an interest, e.g., an interest packet, for a content owned by the content origin 128, e.g., a router, a server, etc., to node 106. Node 106 may broadcast the interest to its neighbors, nodes 110, 112, and 120. The interest packets broadcast transmissions which reach the content origin 128 are not shown for brevity as they may reach their destination and, consequently, may not illustrate the interest starvation problem.

Turning to the starvation problem scenario, some interest packets may not reach the content origin before "starvation". Starvation refers to a condition in the CCN/NDN wherein an interest may be terminally "pending" in the PIT. When receiving an interest requesting for the same content as a pending interest in the PIT, a content router may attempt to avoid duplicate interest transmission by tracking which face(s) transmitted the interest and not forwarding the newly received interest. A starvation problem may arise where the interest packet has been previously forwarded to network nodes but the interest's corresponding data, e.g., a data packet, has (a) not yet been received at the interested node, and (b) has not yet been timed out in the PIT at the relevant network node. For example, interest packets transmitted by the first client 124 may reach remote nodes 102 and 114 separately. Node 102 may receive a forwarded interest via nodes 106, 110, and 108. Node 114 may receive an interest packet via nodes 106, 120, and 102. Upon separately receiving and processing the interest packets, nodes 102 and 114 will each have pending interests indexed in their PITs. Subsequently forwarded interest packets, e.g., interest packets forwarded from node 102 to node 114 and interest packets forwarded from node 114 to node 102, will lead to a PIT hits at nodes 114 and 102, respectively. Due to the way pending interests are processed, upon a PIT hit, no further forwarding, e.g., counterclockwise interest packet forwarding to nodes 108 or 110, may occur. When a subsequent data packet is received at node 110 fulfilling the interest, node 110 will not forward the data packet to node 108 because no interest packets from 108 may have been received. Since node 110 does not forward the data packet to node 108, nodes 108, 114, 102, and 120 may have PIT entries and may not receive the data. This condition is referred to herein as an interest starvation scenario.

Figure 2:
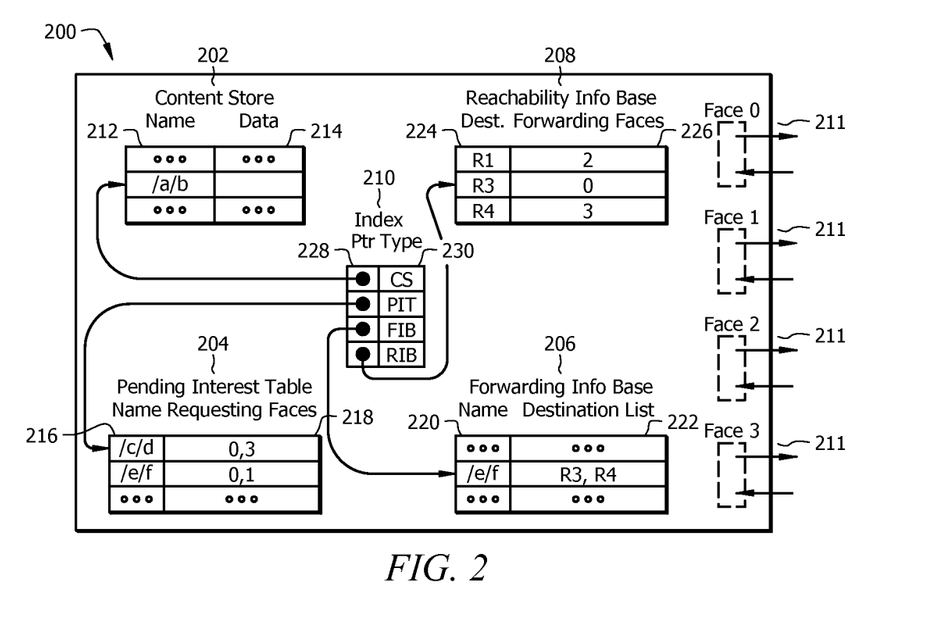
FIG. 2 is an embodiment of a content router for executing an embodiment of a method for scalable routing in content-oriented networks.

FIG. 2 illustrates an embodiment of a content router 200, e.g., a network node 102-120 of FIG. 1, which may be designed to execute an embodiment of a method for scalable routing in content-oriented networks. The content router 200 may comprise a CS 202, a PIT 204, a FIB 206, a RIB 208, an index table 210 that points to the CS 202, PIT 204, FIB 206, and RIB 208, and a plurality of faces 211. The CS 202 may comprise a name element 212 for storing the name of the content and a data element 214 for storing the data content. The PIT 204 may comprise a name element 216 for storing the name of the content and a requesting faces element 218 for storing the identity of the face(s) 211 which forwarded an interest packet to the content router 200. The PIT 204 may keep track of interest packets that have been forwarded upstream toward content source(s) so that returned data packets may be sent downstream to the requestor(s). PIT 204 entries may be erased as soon as they have been used to forward a matching data packet. PIT 204 entries for interests that never find a matching data packet may timeout at predetermined periods. The FIB 206 may comprise a name element 220 for storing a name prefix and a destination list element 222 for storing the destination identity of "landmark" routers for the associated name prefix. The RIB 208 may comprise a destination element 224 and a forwarding faces element 226 for storing the face(s) 211 through which a desired content hosting destination may be reached. The index 210 may comprise a type element 230 and a pointer element 228 for indexing the CS 202, the PIT 204, the FIB 206, and the RIB 208. The interaction of these components during an incoming interest handling process is described further under FIGS. 4 and 5.

Figure 3:
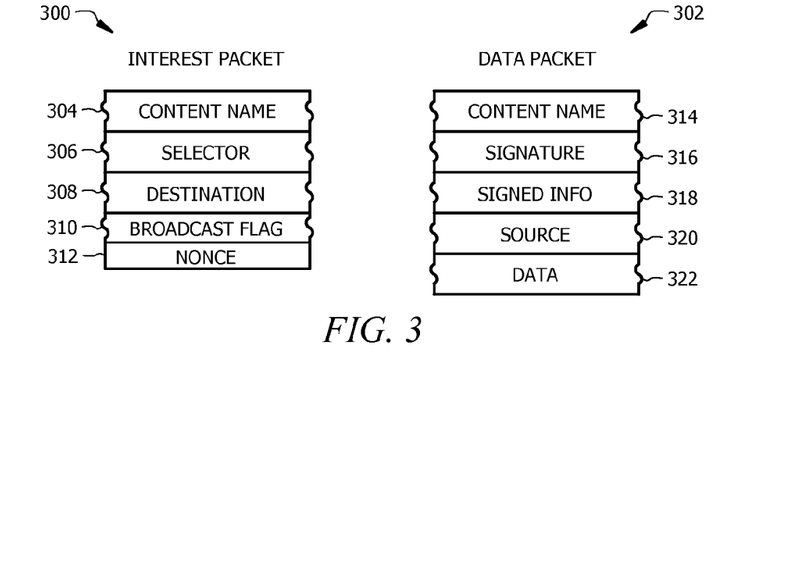
FIG. 3 shows embodiments of an interest packet and a data packet as may be used to enable reactive routing.

FIG. 3 shows an embodiment of an interest packet 300 and a data packet 302 as may be used to enable reactive routing. Adding the RIB and modifying the semantics of the FIB in the content router, e.g., the content router 200 of FIG. 2, may require adding fields to conventional interest packets and data packets. Conventional interest packets may not contain fields for a broadcast flag or a destination. The interest packet 300 may contain fields for a content name field 304, a selector field 306, a destination field 308, a broadcast flag bit 310, and a nonce 312. The content name field 304 may store the name of the content identified by the interest packet 300. The selector field 306 may define what kind of action a selection process performs on a single packet of its input. The destination field 308 may contain the identity of the destination, if known. Setting the broadcast flag bit 310 to '1' may indicate a broadcast interest (B interest), and setting the broadcast flag bit 310 to '0' may indicate a non-broadcast interest (NB interest). A NB interest value may be set following a FIB hit at a router. If known, the router, e.g., content router 200 of FIG. 2, may fill in the destination field 308 in the NB interest with the name of a router which is associated with a transmission path towards the destination or origin, i.e., a "landmark" route, e.g., the router closest to the origin. In a B interest, the destination field 308 may be left empty, e.g., by populating the destination field 308 with a null value. As known in the art, the nonce 312 may comprise a random or pseudo-random number issued in an authentication protocol to ensure that old communications cannot be reused in replay attacks.

Conventional data packets may not contain a field for identifying a data source. The data packet 302 may contain a content name field 314, a signature field 316, a signed information field 318, a source field 320, and a data field 322. The source field 320 may contain the content origin's identification, which may provide a reference for updating the FIB. In some embodiments, the origin may obfuscate its own name, e.g., by hashing its name, for privacy preservation purposes. Further, in some embodiments there may be multiple origins for a given content and intermediate routers may override the source field 320 with its own name.

As described in FIG. 1, an unsatisfied PIT hit may cause starvation of future interests. This problem may be addresses with the broadcast flag bit 310. One property of the starvation is the underlying ring topology wherein some routers on the ring, e.g., node 108 of FIG. 1, prohibit forwarding further interests per their PIT policy. This starvation may be prevented by allowing routers, e.g., node 108, to further forward the B interest under certain terms. In FIG. 1, this may correspond to the B interest forwarding from 108 to 110 as well as from 114 to 102, i.e., traversing the ring topology in both clockwise and counter-clockwise directions. Consequently, once any router in the ring receives the data packet, all other routers may eventually clear the corresponding PIT entry. Thus, when the content router receives a B interest from a face which does not exist in the instant router's PIT (even where the corresponding content is pending), the interest may still be further broadcast.

For any B interest, it is eventually replied with the desired content if found in CS. If the incoming faces have no previous requests for the same content, and if the FIB, e.g., FIB 206 of FIG. 2, has no destination information for the requested content, it may be broadcast further. However, if the FIB does have the destination information, then the interest may be forward as a NB interest, e.g., by changing the broadcast flag bit 310 and filling in the destination field, to faces, e.g., faces 211 of FIG. 2, towards the destination. For any NB interest, since the destination is already filled, the interest may be directly forwarded according to the RIB, e.g., RIB 206 of FIG. 2, in a unicast manner. Alternate embodiments may resort to a broadcast approach, e.g., akin to the original CCN/NDN design, to forward the interest, e.g., converting an NB interest into a B interest before broadcast. However, in such embodiments, intermediate routers may still be required to directly reply with the content data in case of a CS hit.

Figure 4:
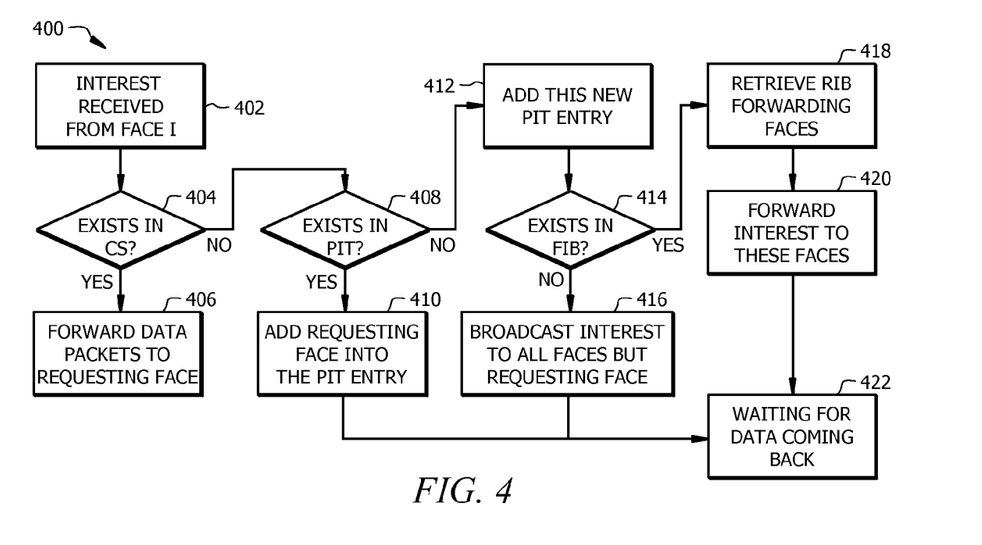
FIG. 4 shows a flowchart for an embodiment of a content router receiving an interest from a face.

FIG. 4 shows a flowchart 400 for an embodiment of a content router, e.g., the content router 200 of FIG. 2, receiving an interest from a face. The CS, PIT, FIB, RIB, index, and faces of FIG. 4 may be substantially the same as the CS 202, PIT 204, FIB 206, RIB 208, index 210, and faces 210 of FIG. 2. At block 402, the content router may receive an interest, e.g., an interest packet 300 of FIG. 3, from a requesting face, e.g., face 211 of FIG. 2. At block 404, the CS is checked for the content name, e.g., at the name element 212 of FIG. 2, to determine whether the content name exists in the CS. If so, the content router may retrieve the data, e.g., from data element 214 of FIG. 2, and may forward the data packets to the requesting face at 406. If a negative result is returned at block 404, at block 408 the PIT is checked to see whether an entry exists in the PIT associated with the content name, e.g., in the name element 212 of FIG. 2. If an entry exists, at block 410 the PIT may add the requesting face to the list of requesting faces associated with that content name, e.g., in requesting face element 218. Following this, at block 422 the content router may wait for data coming back, e.g., via data packets 302 of FIG. 3. If the entry does not exist, process 400 adds a new PIT entry with the content name and the requesting face identity at block 412. At block 414, process 400 checks whether the content name exists in the FIB, e.g., in the name element 220 of FIG. 2. If no entry exists for the content name, the content router may convert the NB interest into a B interest and broadcast the interest to all neighboring faces except for the requesting face at block 416 and may await data coming back at 422. If an entry does exist in the FIB, at 418 the content router may obtain the destination from the FIB destination list, e.g., destination list element 222 of FIG. 2, and may retrieve the RIB forwarding face, e.g., as stored in forwarding faces element 226 of FIG. 2. At block 420, process 400 may convert the B interest into an NB interest and forward the interest to the faces listed in the RIB and, at block 422, may wait for data coming back. As previously stated, a PIT entry may timeout at a predetermined interval between the broadcast and/or forwarding and the data coming back.

Expressed as an algorithm, process 400 may be instantiated as follows:

```
1:   Interest i received from face f
2:   if CS[i] ≠ φ then
3:       Respond with the requested content and send to face f
4:   else
5:       If f ∈ PIT[i] then
6:           Ignore the Interest (e.g., by not further forwarding)
7:       else if PIT[i] = φ or f ∉ PIT[i] then
8:           PIT[i] ← PIT[i] ∪ {f}
9:           if i is a B Interest then
10:              if FIB[i] ≠ φ then
11:                  d ← FIB[i]
12:                  if RIB[d] ≠ φ then
13:                      for all f' ∈ RIB[d] do
14:                          i_broadcast ← 0 and Forward NB Interest i
                                          to f'
15:                      end for
16:                  end if
17:              else
18:                  Broadcast i to all faces but f
19:              end if
20:          else if i is an NB Interest then
21:              d ← i_destination
22:              if d = φ or RIB[d] = φ then
23:                  i_broadcast ← 1 and broadcast B Interest i
17:              else
22:                  for all f' ∈ RIB[d] do
23:                      Forward Interest i to f'
24:                  end for
19:              end if
25:          end if
26:      end if
27:      Wait for data coming back
28:  end if
```

Figure 5:
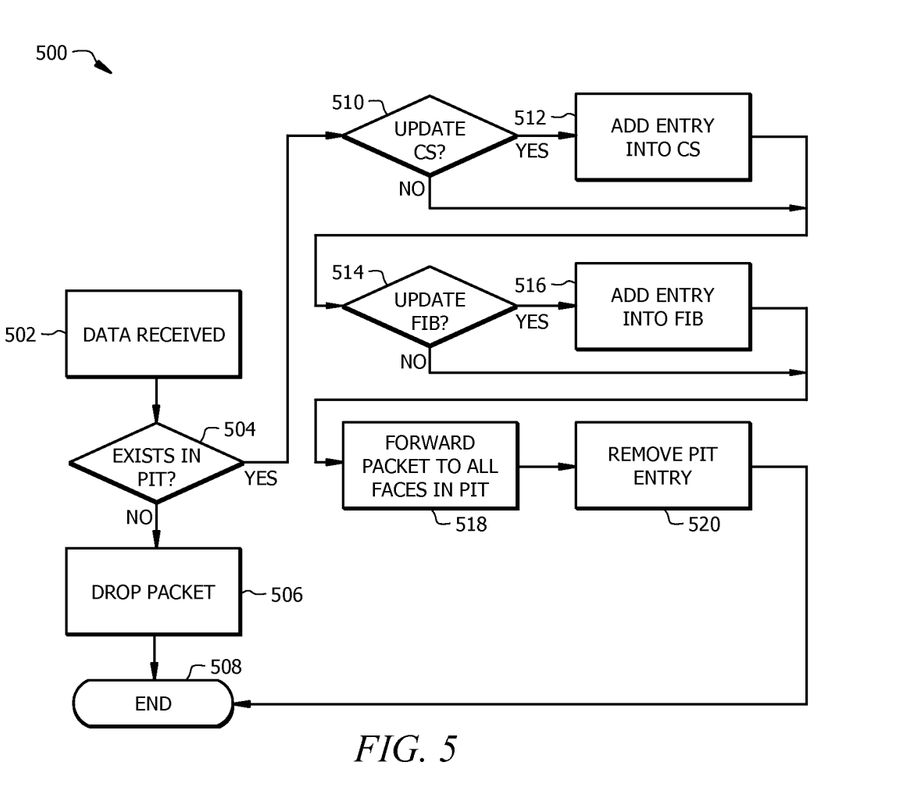
FIG. 5 shows a flowchart for an embodiment of a content router receiving data coming back.

FIG. 5 shows a flowchart 500 for an embodiment of a content router, e.g., the content router of FIG. 4, receiving data coming back. The components of FIG. 5 may be substantially the same as the components of FIG. 4. Process 500 may begin with receiving data, e.g., a data packet 302 of FIG. 3, from a face, e.g., face 211 of FIG. 2. Process 500 may next check the content in the PIT to determine whether a pending interest for the data is contained in the PIT, e.g., in the name element 212 of FIG. 2. If the PIT does not record any interested faces, at block 506 the content router may drop the packet and may end process 500 at block 508. If a PIT entry exists, at block 510 process 500 may determine whether a CS update is needed. If so, at block 512 an entry for the data may be added to the CS, e.g., using the CS name and data elements 212 and 214 of FIG. 2. If the CS does not need to be updated, process 500 may continue and, at block 514, process 500 may determine whether to update the FIB. If so, at block 516 process 500 may add an entry into the FIB, e.g., at name and destination list elements 220 and 222 of FIG. 2. If not, process 500 may continue. Optionally, the content router may update the source field, e.g., source field 320 of FIG. 3, in the packet with its own name. This name may be optionally obfuscated for purposes such as preserving privacy. At block 518, process 500 may forward data packets to all requesting faces stored in the PIT associated with the named data content. At block 520, process 500 may remove the PIT entry as all pending interest requests for the named data content have been satisfied, and process 500 may end at block 508.

Expressed as an algorithm, process 500 may be instantiated as follows:

```
1:   Data i received
2:   if PIT[i] = φ then
3:       Drop the Data
4:   else
5:       Update the CS according to the replacement policy
6:       Update the FIB according to the replacement policy
7:       if decided to update the source field then
8:           if obfuscating name is necessary then
9:               i_source ← this router's obfuscated name
10:          else
11:              i_source ← this router's name
12:          end if
13:      end if
14:      for all f ∈ PIT[i] do
15:          Forward Data i to the face f
16:      end for
17:      PIT[i] ← φ
18:  end if
```

FIGS. 6-11 show the graphic results of evaluating one embodiment of the reactive routing scheme via simulations. The simulations used the Abilene intra-domain network topology. The number of distinct contents used was 150,000 and the total volume of these contents was 150 Terabytes (TB). The arrival rate of interests, e.g., interest packets 300 of FIG. 3, for these contents follows the Poisson distribution. For simplicity, the simulations assumed that the RIB, e.g., RIB 208 of FIG. 2, reflected network connectivity after bootstrap and that the PIT, e.g., PIT 204 of FIG. 2, was sufficiently large to accommodate the topology. The replacement policy for the CS, e.g., CS 202 of FIG. 2, was Least Frequently Used (LFU), and the replacement policy for the FIB was either Least Recently Used (LRU) or LFU, as noted. In the simulated embodiment of the proactive routing scheme, the content origins actively announced their contents every T=1000 time units. Other embodiments may include different replacement policies, permitting a level of cache-like behavior for routing entries based on certain measured criteria associated with the entry. For example, a large body of state-of-the-art caching algorithms may be adopted by permitting the FIB to only cache next-hop information for popular name prefixes, dynamically evicting "cold" or unpopular entries (e.g., entries with relatively fewer transmitted interest packets associated with the content) to make space for entries associated with "hot" or more popular content. Other measured criteria may include reachability, FIB misses, etc., as would be apparent to those of skill in the art.

Three metrics were used in the evaluations: (1) the average end-to-end (E2E) delay, which reflects the user experienced quality of service, (2) the total number of broadcast packets, which reflects the protocol efficiency and the scalability of the design, and (3) hit ratio of CS and FIB. In each experiment, multiple rounds of simulation were run with 400,000 interest "requests" in each round, with the average performance reported. As used herein, the CS size ratio ($\chi$) is the ratio of the CS size to the total content volume. As used herein, the FIB size ratio ($\phi$) is the ratio of the FIB size to the total number of name prefixes.

Figure 6:
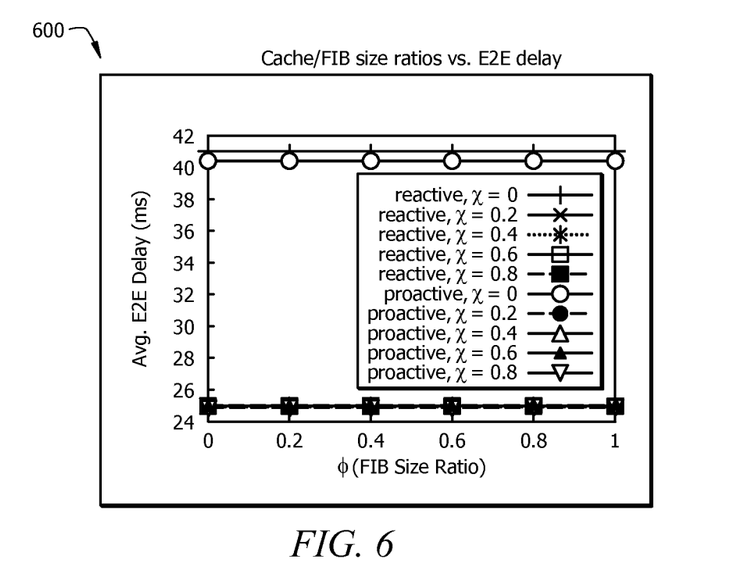
FIG. 6 shows the summarized results of average E2E delay for one embodiment of the reactive routing scheme.

FIG. 6 shows the summarized results 600 of average E2E delay against FIB size ratio $\phi$. The FIB size ratio was varied up to 1 to show an evident trend; $\phi$ may, in practice, likely be small. As shown in FIG. 6, the proactive and reactive $\chi=0$ lines returned an average E2E delay in excess of 40 milliseconds (ms), while the remaining simulated cases for varying values of $\chi$ returned average E2E delays of about 25 ms.

Figure 7:
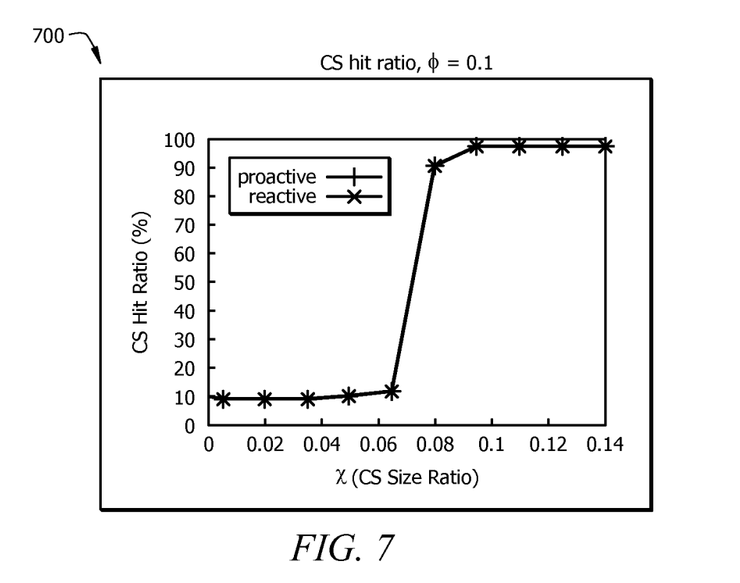
FIG. 7 shows summarized graphic results of CS hit ratios for one embodiment of the reactive routing scheme.
Figure 8:
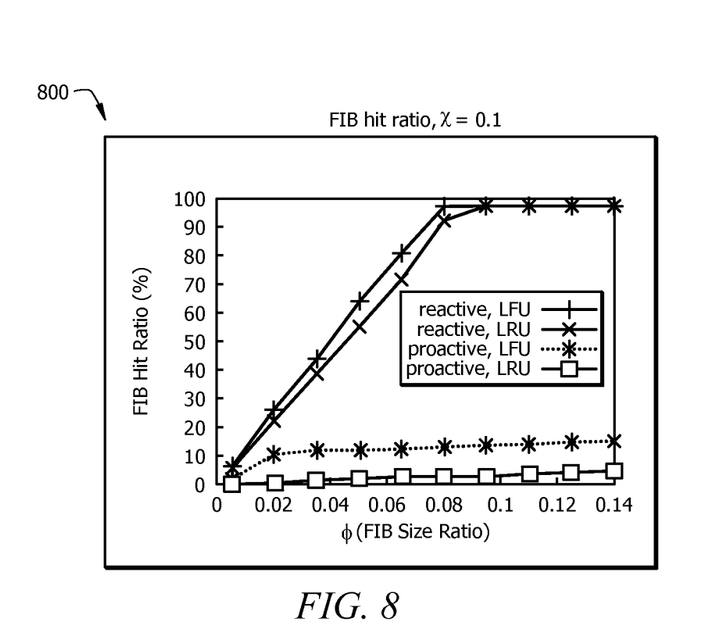
FIG. 8 shows summarized graphic results of FIB hit ratios for one embodiment of the reactive routing scheme.

FIG. 7 shows summarized results of CS hit ratios. FIG. 8 shows summarized results of FIB hit ratios. The CS and FIB size ratios in FIGS. 7 and 8 were varied between 0.005 and 0.140. These two size ratios may be small in realistic environments. In FIG. 7, the CS hit ratio for both the proactive and reactive scenarios approach 100% when $\chi \geq 0.10$, which follows from the content requests following the Zipf distribution such that most contents are "cold". In FIG. 8, the FIB hit ratio for the reactive LFU and LRU scenarios increase linearly when $\phi \leq 0.08$ and may be approximately 700-900% higher than CS hit ratios for proactive LFU and LRU scenarios when $\phi \geq 0.08$. The LFU replacement policy may be preferred over LRU for both CS and FIB.

Figure 9:
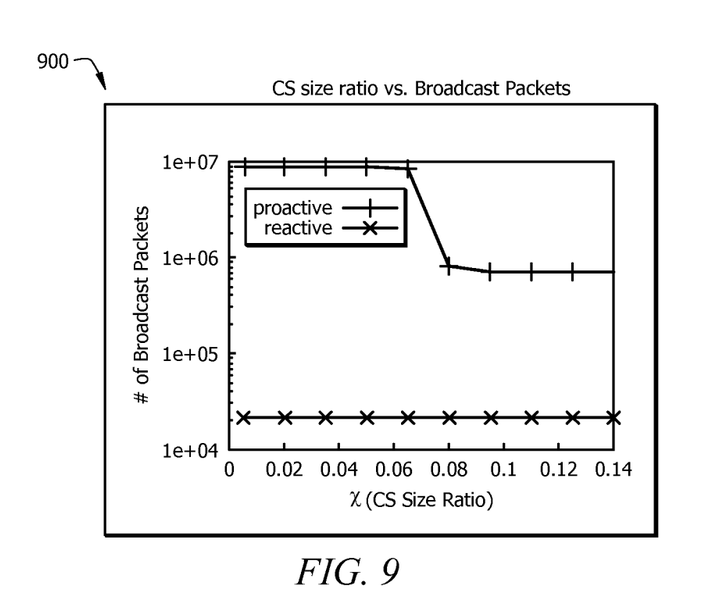
FIG. 9 shows a plot for the number of broadcast packets when varying the CS size for one embodiment of the reactive routing scheme.

FIG. 9 shows a plot for the number of broadcast packets transmitted when varying the CS size (FIB size ratio $\phi=10\%$) for the evaluated embodiment. In FIG. 9, increasing CS size may reduce the number of broadcast packets in a proactive scenario, since a larger CS may absorb more interest packets. However, the number of broadcast packets for the reactive scenario may be two to three orders of magnitude lower than that by the proactive scheme. In practice, the improvement may be much higher as the number of contents may be much larger.

Figure 10:
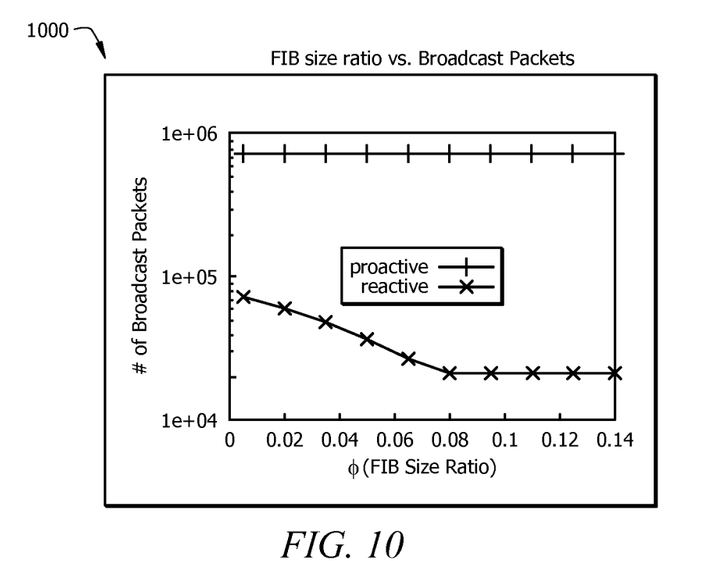
FIG. 10 shows a plot for the results when varying the FIB size for one embodiment of the reactive routing scheme.

FIG. 10 shows a plot for the results when varying the FIB size (CS size ratio $\chi=10\%$). The proactive scheme shown in FIG. 10 may be less sensitive to FIB size due to the large overhead of the active announcement. In contrast, the reactive scheme may achieve approximately one to two orders of magnitude reduction in broadcast packets, in part due to the treatment of the interest after the FIB hit.

Figure 11:
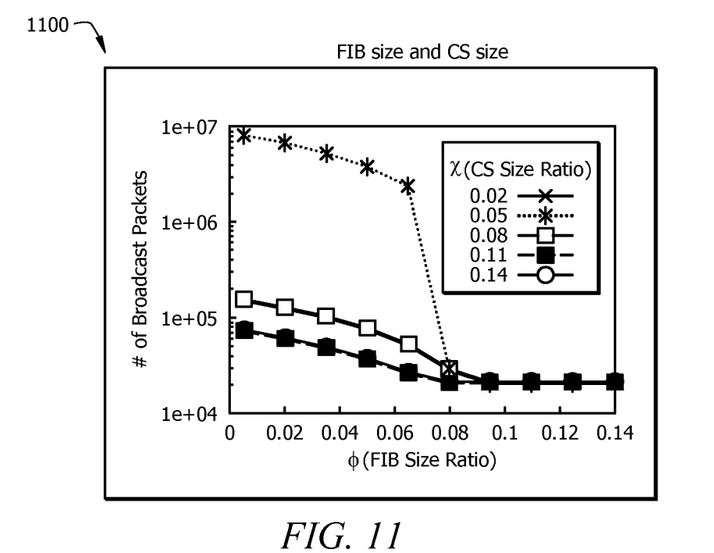
FIG. 11 shows the joint impacts on reduction of broadcast overhead for one embodiment of the reactive routing scheme.

FIG. 11 shows the joint impacts on reduction of broadcast overhead. The curves depicted correspond to the performance of the reactive scheme when the FIB and CS size vary simultaneously. When CS size is small, e.g., approximately $\chi \leq 5\%$, increasing FIB size may improve system efficiency. For example, increasing $\phi$ from 0.02 to 0.08 yields almost three orders of magnitude reduction in the number of broadcast packets. The amount of improvement may lessen when CS size is increasing beyond approximately 8%. Where the set of requested content is sufficiently large, CS of any single router may be unlikely to be able to cache 8% or more of all contents. Further, the CS size may impact both the E2E delay and the broadcast overhead; the FIB size may impact only the latter.

The simulation results shown in FIGS. 6-11 may indicate that the E2E delay may be sensitive to the CS size ratio but not FIB size ratio. The E2E delay may not further decrease when the CS size ratio exceeds a certain threshold, e.g., approximately 20% in FIG. 7. In cases described in FIG. 6, the proactive and reactive schemes (1) may result in negligible differences in the average E2E delay, in part due to the fact that whether the destination of the content origin is known, e.g., by the presence of a FIB entry corresponding to a name, or (2) may not reduce the E2E delay, since interest broadcast may also reach the content origin along the shortest path. These results may further suggest that in real-world name-oriented networks, CS size may be more likely to have a greater impact on the E2E delay than FIB size.

As described above, the reactive content-centric routing scheme may address the scalability challenge for intra-domain networks. The evaluations demonstrate that the reactive routing schemes may lead to two to three orders of magnitude fewer broadcast packets than proactive schemes while maintaining approximately the same level of user-perceived E2E latency. The CS size ratio may impact both the E2E delay and the broadcast overhead while FIB size ratio may impact only the latter. However, when the CS only caches a small portion of contents, increasing FIB size may be inevitable and may result two to three order of magnitude reduction on the number of broadcasts. The proposed scheme may also address the interest starvation problem, and may effectively reduce the broadcast interest after the FIB hit.

Figure 12:
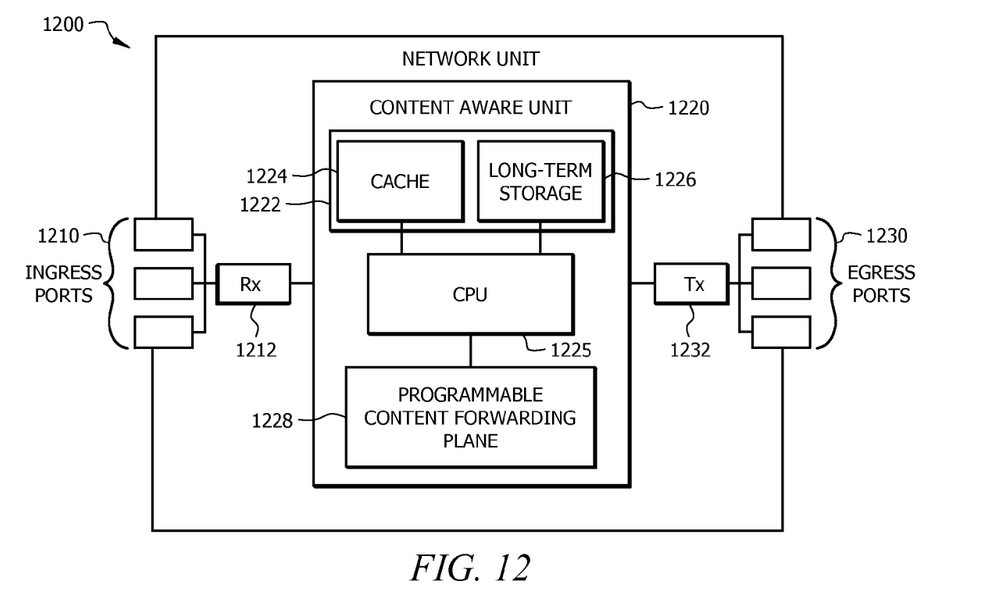
FIG. 12 is a general purpose network apparatus.

At least some of the features/methods described in the disclosure may be implemented in a network apparatus or component, such as a network node or unit. For instance, the features/methods of the disclosure may be implemented using hardware, firmware, and/or software installed to run on hardware. The network apparatus/component or unit may be any device that transports frames through a network, e.g., a switch, router, bridge, server, etc. FIG. 12 illustrates an embodiment of a network node 1200, which may be any device that transports and processes data through a network. For instance, the network node 1200 may be a content router or any node or router in the CCN/NDN schemes described above. The network node 1200 may be configured to implement or support the adaptive forwarding strategies described above. The network node 1200 may comprise one or more ingress ports or faces 1210 coupled to a receiver (Rx) 1212 for receiving signals and frames/data from other network components. The network node 1200 may comprise a content aware unit 1220 to determine which network components to send content to. The content aware unit 1220 may be implemented using hardware, software, or both. The content aware unit 1220 may comprise a general purpose processor 1225, which may alternately or optionally be an application specific integrated circuit (ASIC), or a digital signal processor (DSP). The network unit 1200 may also comprise one or more egress ports or faces 1230 coupled to a transmitter (Tx) 1232 for transmitting signals and frames/data to the other network components. The receiver 1212, content aware unit 1220, and transmitter 1232 may also be configured to implement at least some of the disclosed methods, which may be based on hardware, software, or both. The components of the network node 1200 may be arranged as shown in FIG. 12.

The content aware unit 1220 may also comprise a programmable content forwarding plane block 1228 and one or more storage blocks 1222 that may be coupled to the programmable content forwarding plane block 1228. The programmable content forwarding plane block 1228 may be configured to implement content forwarding and processing functions, such as at an application layer or layer 3 (L3) in the Open Systems Interconnection (OSI) model, where the content may be forwarded based on content name or prefix and possibly other content related information that maps the content to network traffic. Such mapping information may be maintained in a content table at the content aware unit 1220 or the network unit 1200. The programmable content forwarding plane block 1228 may interpret user requests for content and accordingly fetch content, e.g., based on metadata and/or content name, from the network or other content routers and may store the content, e.g., temporarily, in the storage blocks 1222. The programmable content forwarding plane block 1228 may then forward the cached content to the user. The programmable content forwarding plane block 1228 may be implemented using software, hardware, or both and may operate above the IP layer or layer 2 (L2) in the OSI model. The storage blocks 1222 may comprise a cache 1224 for temporarily storing content, e.g., a Random Access Memory (RAM). Additionally, the storage blocks 1222 may comprise a long-term storage 1226 for storing content relatively longer, e.g., a Read Only Memory (ROM). For instance, the cache 1224 and the long-term storage 1226 may include Dynamic random-access memories (DRAMs), solid-state drives (SSDs), hard disks, or combinations thereof. Notably, the storage blocks 1222 may be used to house the contents of a content router, e.g., content router 200 of FIG. 2, e.g., CS 202, PIT 204, FIB 206, RIB 208, and/or index 210 of FIG. 2.

It is understood that by programming and/or loading executable instructions onto the network node 1200, at least one of the processor 1220, the cache 1224, and the long-term storage 1226 are changed, transforming the network node 1200 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for routing content, comprising:
receiving an interest packet from a first face, wherein the interest packet comprises a content name field populated with a first content name, a destination field, and a broadcast flag field set to broadcast, wherein the broadcast field indicates whether the first face has previously received a request having the first content name; and
receiving a data packet from a second face, wherein the data packet comprises a content name field populated with a second content name, a source field populated with an identity of a source of data associated with the second content name, and a data field populated with the data associated with the second content name.

2. The method of claim 1, further comprising:
forwarding the interest packet to a third face, wherein an identity of the third face is selected from a Reachability Information Base (RIB) entry associated with a destination, and wherein the destination is selected from a destination list in a Forwarding Information Base (FIB) entry associated with the first content name.

3. The method of claim 2, further comprising setting the broadcast flag field to non-broadcast prior to forwarding the interest packet.

4. The method of claim 1, further comprising:
checking a Content Store (CS) for an entry associated with the first content name;
when the CS entry exists, sending data associated with the CS entry to the first face;
when the CS entry does not exist:
checking a Pending Interest Table (PIT) for an entry associated with the first content name;

when the PIT entry exists, adding an identity of the first face to the PIT entry; and when the PIT entry does not exist, creating a PIT entry for the first content name.

5. The method of claim 4, further comprising:

checking a Forwarding Information Base (FIB) for an entry associated with the first content name;

when the FIB entry does not exist, broadcasting the interest to a plurality of faces;

when the FIB entry exists:

retrieving at least one forwarding face associated with a destination list in the FIB entry; and forwarding the interest packet to the at least one forwarding face.

6. The method of claim 5, wherein the first content name is the same as the second content name, wherein no CS entry associated with the first content name, further comprising:

creating a CS entry, wherein the CS entry comprises the first content name and the data; and adding the identity of the source to the destination list in the FIB entry associated with the first content name.

7. The method of claim 5, wherein the FIB entry exists, further comprising updating the FIB entry based on at least one measured criteria associated with the FIB entry.

8. An apparatus comprising:

a processor configured to:

receive an interest packet from a first forwarding interface (face), wherein the interest packet comprises a content name field populated with a content name, and wherein the interest packet further comprises a broadcast flag that indicates whether the first face has previously received a request comprising the requested content name;

add the content name and an identity of the first face to a Pending Interest Table (PIT);

obtain a destination associated with the content name from a Forwarding Information Base (FIB);

retrieve the identity of a second face associated with a transmission path to the destination from a Reachability Information Base (RIB); and forward the interest packet to the second face.

9. The apparatus of claim 8, wherein the processor is further configured to set the broadcast flag to non-broadcast following obtaining the destination from the FIB.

10. The apparatus of claim 8, wherein the processor is further configured to await receipt of a data packet having data corresponding to the content name.

11. The apparatus of claim 8, wherein the destination comprises a null value, and wherein the second face is selected from a plurality of available network paths.

12. The apparatus of claim 8, wherein the processor is further configured to:

receive a data packet from a third face, wherein the data packet comprises a content name field populated with the content name and a data field populated with data;

verify that the content name is associated with an entry in the PIT;

retrieve the identity of at least one requesting face associated with the entry; and forward the data to the at least one requesting face.

13. The apparatus of claim 12, wherein the processor is further configured to add the content name and the data to a Content Store (CS).

14. The apparatus of claim 8, wherein the processor is further configured to apply a replacement policy at the FIB, wherein the replacement policy comprises updating an FIB entry based on at least one measured criteria associated with the FIB entry.

15. A computer program product comprising computer executable instructions stored on a non-transitory medium that when executed by a processor cause the processor to perform the following:

receive an interest packet from a requesting interface (face), wherein the interest packet comprises a content name field populated with a content name;

check a Content Store (CS) for an entry associated with the content name;

when the CS entry exists, send data from the entry to the requesting face;

when the CS entry does not exist, check a Pending Interest Table (PIT) for an existing entry associated with the interest packet;

when the PIT entry exists, drop the interest packet;

when the PIT entry does not exist, create a PIT entry with the content name and an identity of the requesting face;

check a Forwarding Information Base (FIB) for a FIB entry associated with the content name, wherein the FIB entry comprises a destination;

when the FIB entry exists:

retrieve the destination from the FIB;

retrieve the identity of a second face associated with a transmission path to the destination from a Reachability Information Base (RIB); and forward the interest packet to the second face; and when the FIB entry does not exist, forward the interest packet to a plurality of neighboring faces.

16. The computer program product of claim 15, wherein the interest packet further comprises a broadcast flag bit.

17. The computer program product of claim 16, wherein when the destination associated with the content name exists in the FIB, the instructions further cause the processor to:

set the broadcast flag bit to non-broadcast; and apply a replacement policy on the FIB entry.

18. The computer program product of claim 15, wherein the instructions further cause the processor to perform the following:

receive a data packet from a third face, wherein the data packet comprises a content name field populated with the content name, a source field populated with the identity of a source, and a data field populated with data;

check the Content Store (CS) for an entry associated with the content name;

when the CS entry exists, drop the data packet; and when the CS entry does not exist, create a CS entry, wherein the CS entry comprises the content name and the data.

19. The computer program product of claim 18, wherein the instructions further cause the processor to forward the data packet to all requesting faces in the PIT entry associated with the content name.

* * * * *